(12) United States Patent
Lloyd

(10) Patent No.: US 9,032,985 B2
(45) Date of Patent: May 19, 2015

(54) TAP MOUNTING FOR A PLUMBING FIXTURE

(75) Inventor: Ian Lloyd, Tamworth (GB)

(73) Assignee: Bristan Group Limited, Tamworth, Staffordshire (GB)

( * ) Notice: Subject to any disclaimer, the term of this patent is extended or adjusted under 35 U.S.C. 154(b) by 234 days.

(21) Appl. No.: 13/699,962

(22) PCT Filed: May 27, 2011

(86) PCT No.: PCT/GB2011/051010
§ 371 (c)(1),
(2), (4) Date: Feb. 26, 2013

(87) PCT Pub. No.: WO2011/148195
PCT Pub. Date: Dec. 1, 2011

(65) Prior Publication Data
US 2013/0199623 A1 Aug. 8, 2013

(30) Foreign Application Priority Data

May 27, 2010 (GB) .................................. 1008866.4
Apr. 21, 2011 (GB) .................................. 1106770.9

(51) Int. Cl.
*F16L 3/12* (2006.01)
*E03C 1/04* (2006.01)

(52) U.S. Cl.
CPC .................. *F16L 3/12* (2013.01); *E03C 1/0401* (2013.01); *E03C 1/0402* (2013.01)

(58) Field of Classification Search
USPC .............. 137/15.01, 315.12, 359, 801; 4/695, 4/678, 675
See application file for complete search history.

(56) References Cited

U.S. PATENT DOCUMENTS 6,138,296 A 10/2000 Baker
6,301,728 B1 10/2001 Pilatowicz et al.
(Continued)

FOREIGN PATENT DOCUMENTS

CA 2 455 458 7/2004
DE 698 26 047 9/2005

OTHER PUBLICATIONS

PCT International Preliminary Report on Patentability, International Application No. PCT/GB2011/051010, dated Nov. 27, 2012, 10 pgs.

*Primary Examiner* — Kevin Lee
(74) *Attorney, Agent, or Firm* — Faegre Baker Daniels LLP

(57) ABSTRACT

A tap mounting (11) for mounting a tap to a plumbing fixture (66), the plumbing fixture having a surface with an aperture (64). The tap mounting (11) comprises an over-surface mounting part (12), an under-surface mounting part (13) defining a threaded aperture (58), a threaded elongate member (40) and a second elongate member (28). In use the over-surface mounting part is above the surface of the plumbing fixture, the under-surface mounting part is below the surface of the plumbing fixture. The elongate members extend from the over-surface mounting part through the plumbing fixture aperture and the threaded elongate member passes through the threaded aperture of the under-surface mounting part. Rotation of the under-surface mounting part is prevented by the second elongate member. The threaded elongate member comprises an internal bore and is configured for connection to a hose. On installation of the tap mounting, the under-surface mounting part is arranged to be passed through the plumbing fixture aperture substantially without deformation, and the tap mounting is configured to enable it to be secured to the plumbing fixture by manipulation of the tap mounting substantially wholly at or above the surface of the plumbing fixture.

13 Claims, 18 Drawing Sheets

(56) References Cited

U.S. PATENT DOCUMENTS

| | | |
|---|---|---|
| 6,792,629 B2 | 9/2004 | Nelson et al. |
| 7,003,818 B2 | 2/2006 | McNerney et al. |
| 7,174,581 B2 | 2/2007 | McNerney et al. |
| 7,269,864 B2 | 9/2007 | Brown et al. |
| 7,698,755 B2 | 4/2010 | McNerney et al. |
| 7,979,929 B2 | 7/2011 | Vogel et al. |
| 8,407,828 B2 | 4/2013 | Vogel et al. |
| 8,464,748 B2 * | 6/2013 | Pinette .......................... 137/801 |
| 2003/0221254 A1 | 12/2003 | McNerney et al. |
| 2005/0022299 A1 | 2/2005 | Brown et al. |
| 2006/0080773 A1 | 4/2006 | McNerney et al. |
| 2006/0180221 A1 | 8/2006 | Ko |
| 2006/0200904 A1 | 9/2006 | Vogel et al. |
| 2007/0044232 A1 | 3/2007 | McNerney et al. |
| 2009/0139024 A1 | 6/2009 | Vogel et al. |
| 2013/0042926 A1 | 2/2013 | Jonte et al. |
| 2013/0048100 A1 | 2/2013 | Jonte et al. |

* cited by examiner

US 9,032,985 B2

TAP MOUNTING FOR A PLUMBING FIXTURE

This application is a 371 national phase filing of International Application No. PCT/GB2011/051010, filed May 27, 2011, which claims the benefit of GB Application Serial No. 1008866.4, filed May 27, 2010 and GB Application Serial No. 1106770.9, filed Apr. 21, 2011, the disclosures of which are expressly incorporated by reference herein.

BACKGROUND OF THE INVENTION

The present invention relates to a tap mounting designed for improved ease of attachment to a basin, bath or other plumbing fixture.

Fitting a tap to a plumbing fixture such as a basin or bath usually involves attaching the tap to the top of the fixture and connecting the tap to the pipe work directly or via a hose or hoses beneath the fixture. Such connections between tap and hose require tightening with some form of tool. There is often a lack of space beneath a basin or bath, due in some part to their usually being positioned against a wall or, in the case of a basin/sink, in a counter over a cupboard. The lack of space considerably hampers connection of taps to hoses, particularly when it comes to manoeuvring the necessary tools.

Document U.S. Pat. No. 6,301,728 shows an assembly for a tap where a retainer for a tap fitting is inserted through a hole in the basin from above, then extended by rotation of the bolts. Further rotation of the bolts brings the retainer up against the underside of the basin. Water supply lines are then passed up from the underside of the basin and attached to the tap. Although this goes some way towards mitigating the problem, it is by no means ideal. The above assembly is complicated, and additional parts such as the multi-component retainer are used. What is required is a simple tap mounting assembly that may be easily fitted to an exposed surface of a plumbing fixture.

SUMMARY OF THE INVENTION

It is an object of the invention to provide an improved tap mounting.

According to the present invention there is provided a tap mounting for mounting a tap to a plumbing fixture, the plumbing fixture having a surface with an aperture, and the tap mounting comprising an over-surface mounting part, an under-surface mounting part defining a threaded aperture, a threaded elongate member and a second elongate member, wherein in use the over-surface mounting part is above the surface of the plumbing fixture, the under-surface mounting part is below the surface of the plumbing fixture, the elongate members extend from the over-surface mounting part through the plumbing fixture aperture and the threaded elongate member passes through the threaded aperture of the under-surface mounting fixture, wherein rotation of the under-surface mounting part is prevented by the second elongate member, wherein the threaded elongate member comprises an internal bore and is configured for connection to a hose, wherein on installation of the tap mounting the under-surface mounting part is arranged to be passed through the plumbing fixture aperture substantially without deformation, and wherein the tap mounting is configured to enable it to be secured to the plumbing fixture by manipulation of the tap mounting substantially wholly at or above the surface of the plumbing fixture.

BRIEF DESCRIPTION OF THE DRAWINGS

Preferred embodiments of the invention will now be described with reference to the accompanying drawings in which.

DETAILED DESCRIPTION OF THE DRAWINGS

Figure 1:
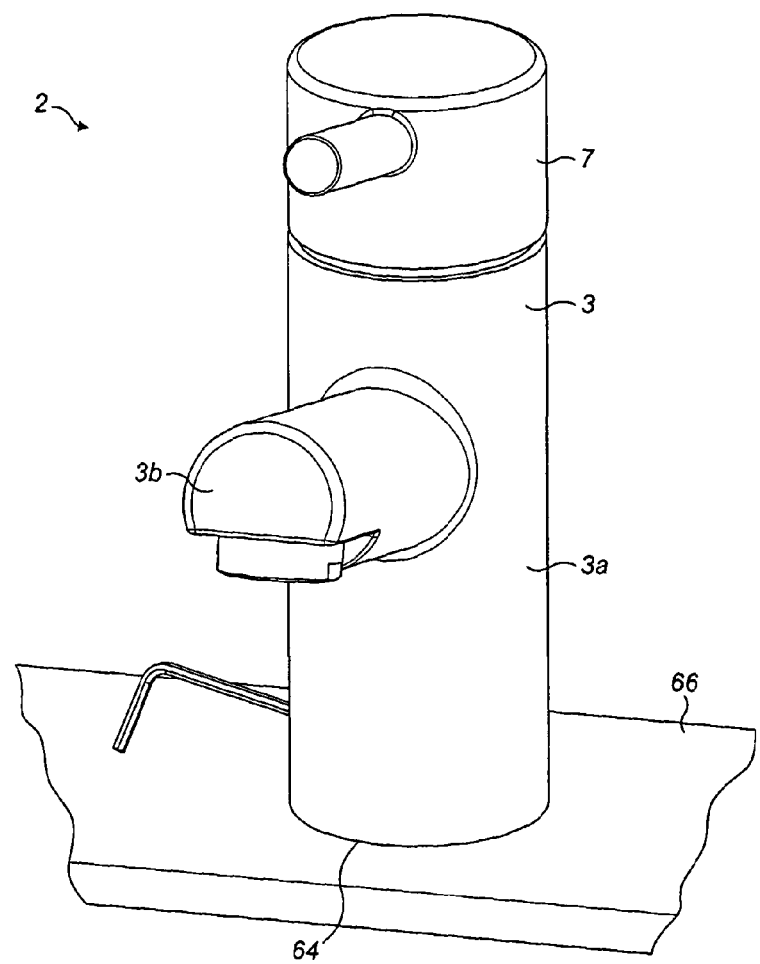
FIG. 1 shows a perspective view of a tap fitting according to a first embodiment of the present invention.
Figure 2:
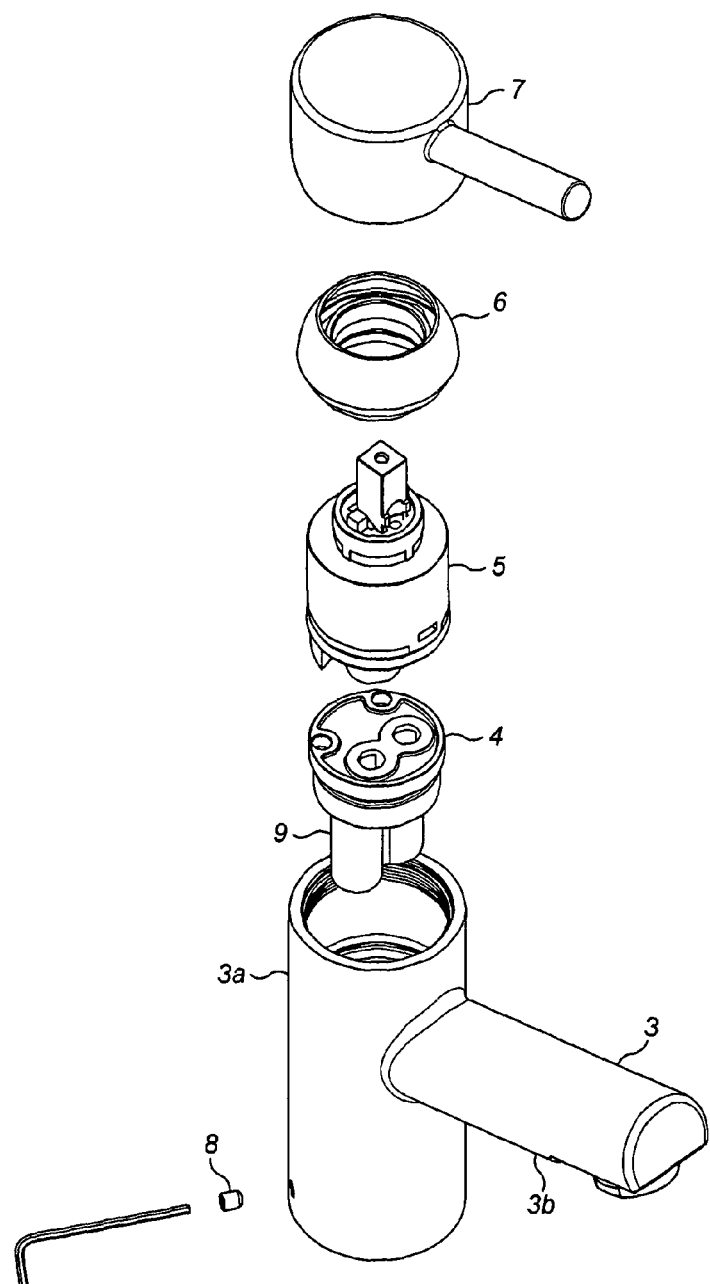
FIG. 2 shows an exploded view of the tap of FIG. 1.

With reference to FIGS. 1 to 4, the tap fitting 10 comprises in this embodiment a mixer tap 2 for a basin. The mixer tap is made up of a mixer body 3, a lower 4 and an upper 5 cartridge seating, a cartridge retaining nut and shroud 6 and a handle 7. The mixer body 3 comprises a pipe 3a with a perpendicular water outlet spout 3b extending from it. The cartridge 5 and the cartridge seating 4 (not always required) are housed in the mixer body 3, and are held in place by the retaining nut and shroud 6. The cartridge seating 4 comprises a pair of water inlets 9 leading to the cartridge 5. The handle 7 is lifted and rotated to control water flow rate and temperature. The mixer tap 2 is connected to a basin 66 by means of a tap mounting 11. A grub screw 8 is used to secure the lower end of the mixer tap 2 to the tap mounting 11.

Figure 3:
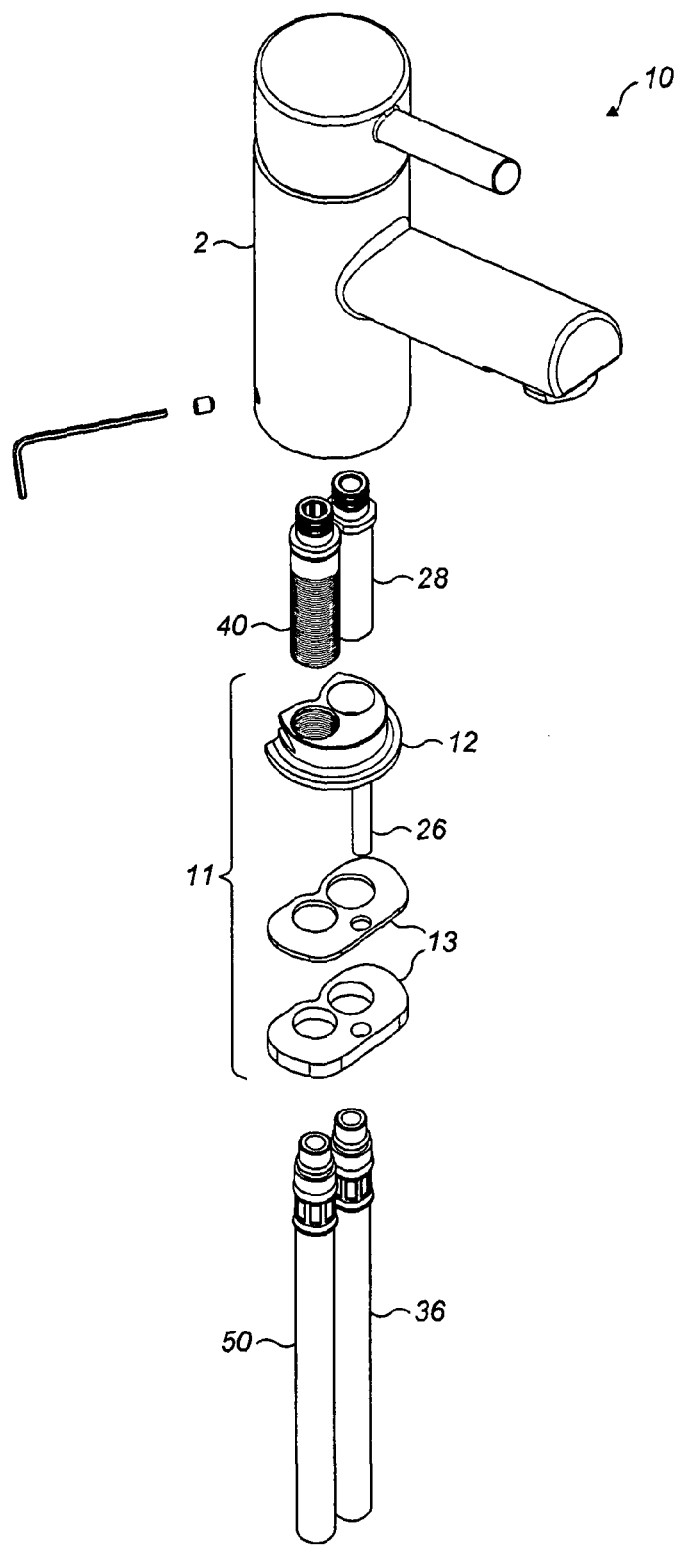
FIG. 3 shows an exploded view of the embodiment of FIG. 1.
Figure 4:
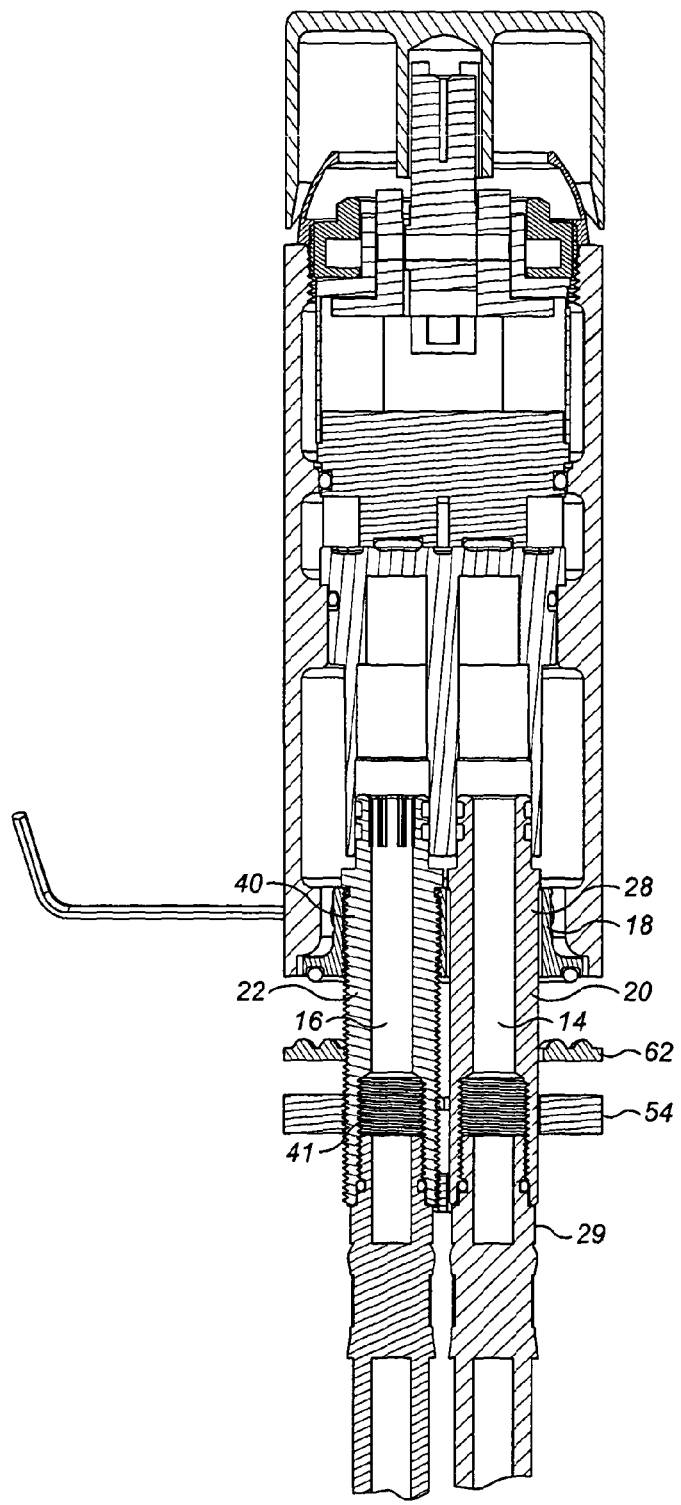
FIG. 4 shows a cross-section through the embodiment of FIGS. 1 and 3.
Figure 5:
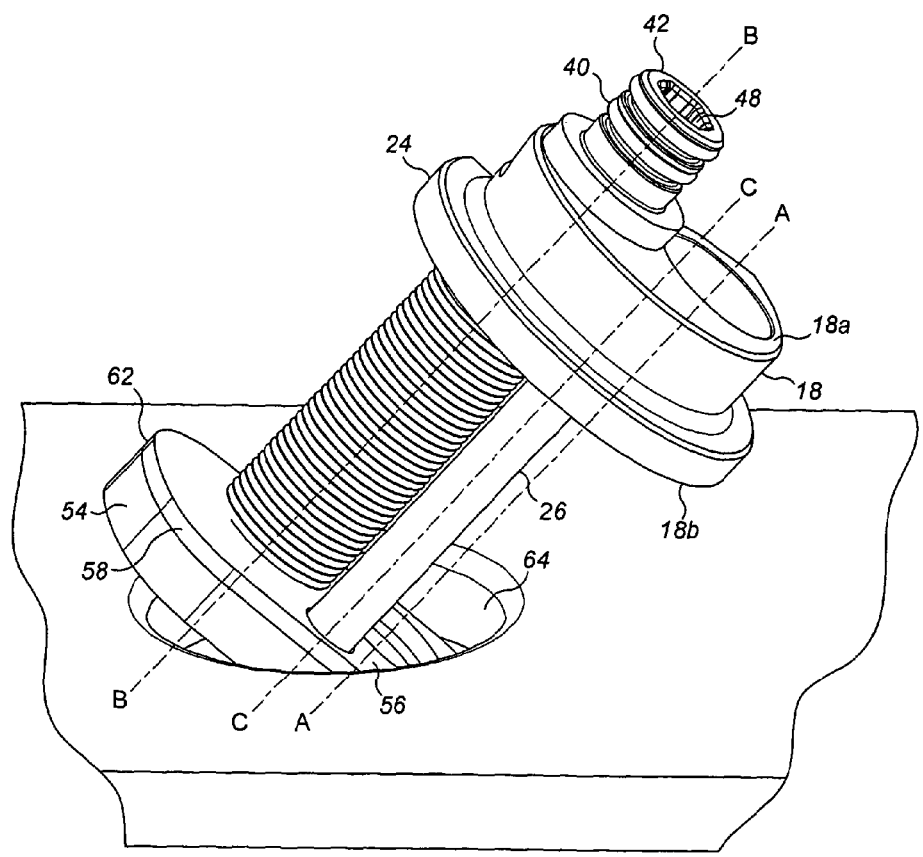
FIG. 5 shows a first stage of installation of the tap fitting of the embodiment of FIGS. 1 and 3.

With reference to FIGS. 3, 4 and 5, the tap mounting 11 comprises in this embodiment an over-surface or upper mounting part 12 and an under-surface or lower mounting part 13. The upper mounting part 12 comprises a substantially kidney-shaped base body 18 having an upper side 18a, a lower side 18b and first and second cylindrical base apertures 20, 22 extending through the base 18 from the upper side 18a to the lower side 18b. The base apertures have parallel longitudinal axes A and B (see FIG. 5). A flange 24 edges the lower side 18b of the base 18. Extending from the lower side 18b of the base is a guide pin 26. The guide pin 26 has a longitudinal axis C parallel to axes A and B.

The lower mounting part 13 comprises a kidney-shaped fixing plate 54 and a kidney-shaped washer 62. The fixing plate 54 has first and second inlet connector apertures 56, 58 and a guide pin aperture 60. The washer 62 has corresponding apertures. The second fixing plate aperture 58 is threaded.

The tap fitting 10 further comprises first and second inlet connectors 28, 40 and first and second flexible hoses 36, 50. The first inlet connector 28 may also be referred to as a second elongate member, while the second inlet connector 40 may also be referred to as a threaded elongate member. Each inlet connector 28, 40 has an internal bore, an upper end 30, 42 and a lower end 32, 44, and a circumferential collar 34, 46 towards the upper end 30, 42. Both inlet connectors 28, 40 have an internal threaded section 29, 41 towards their respective lower ends 32, 44. The second inlet connector 40 is threaded on its outer surface from its collar 46 to its lower end 44, and has a hexagonal aperture 48 at its upper end 42.

Each flexible hose 36, 50 has a free end and an end connected to a plumbing system (not shown). At each free end is a hose fitting 38, 52 having an external threaded section 39, 53 and an external O-ring seal 37, 51.

Figure 6:
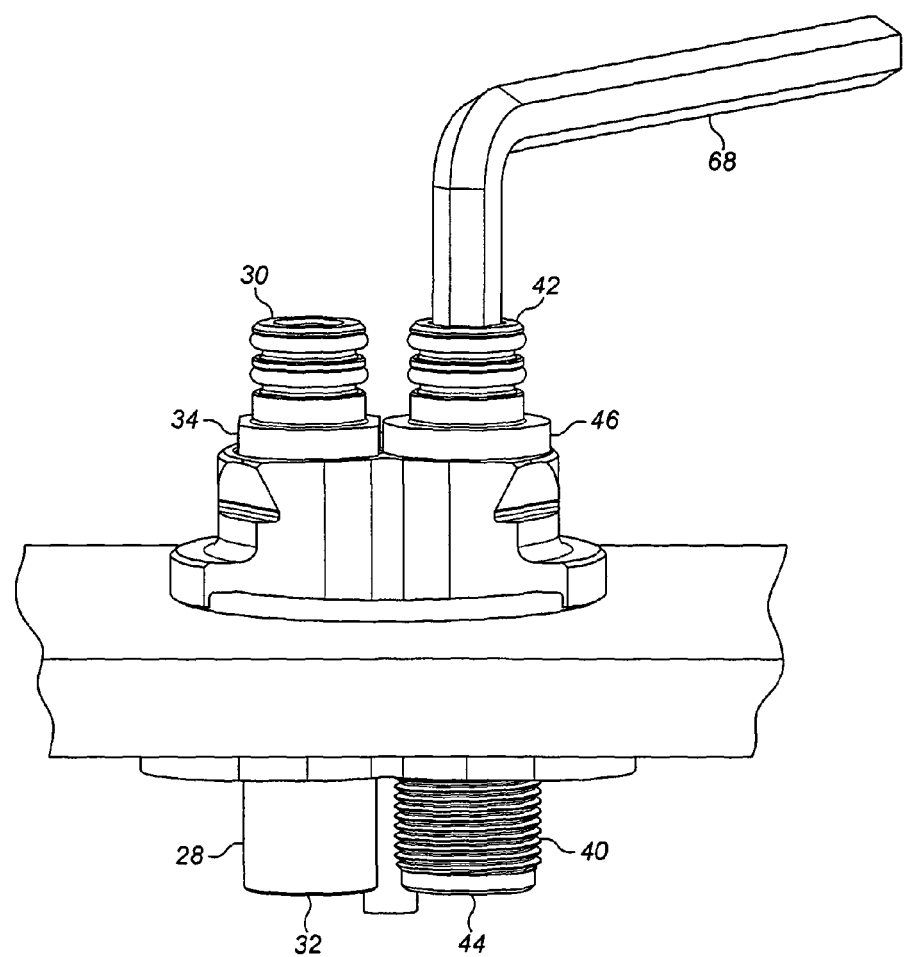
FIG. 6 shows a second stage of installation of the embodiment of FIGS. 1 and 3.
Figure 7:
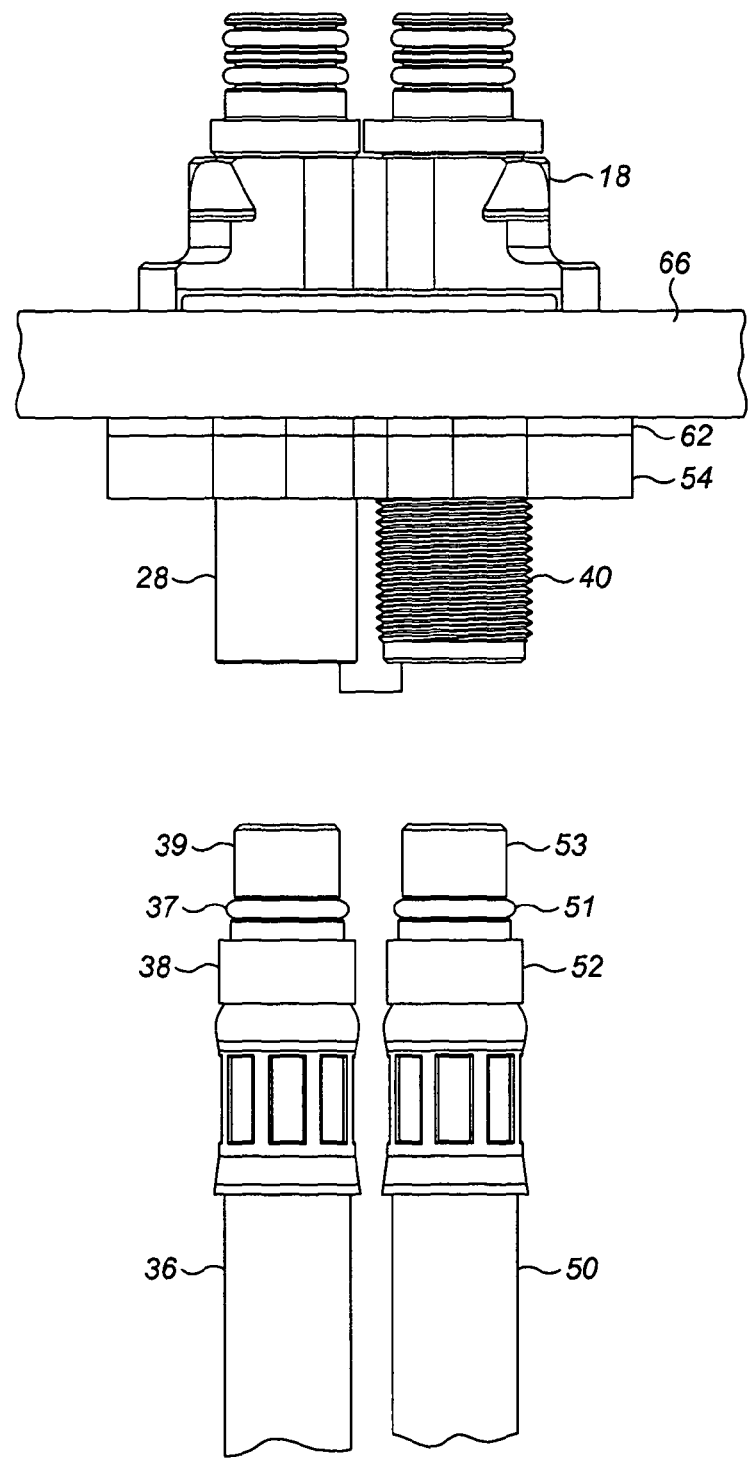
FIG. 7 shows a third stage of installation of the embodiment of FIGS. 1 and 3.

On installation, stages of which are shown in FIGS. 5 to 7, the second inlet connector 40 is inserted through the second base aperture 22 until the collar 46 contacts the upper side 18a of the base 18. The washer 62 is fitted over the lower end 44 of the second inlet connector 40. The fixing plate 54 is screwed to the lower end 44 of the second inlet connector 40 below the washer 62 by means of the tapped second aperture 58. The guide pin 26 extends through the washer and the guide pin aperture 60. The lower end 44 of the second inlet connector, together with the washer 62 and the fixing plate 54, is inserted through a tap aperture 64 in the basin 66 from the exposed upper side of the basin 66. The shape of the fixing plate 54 allows it to be manoeuvred through the tap aperture 64 without deformation.

The lower side 18b of the base is then in position on the exposed upper side of the basin 66. The washer 62 and the fixing plate 54 are at the lower end 44 of the second inlet connector 40, so are not yet securing the base 18 in place. The second inlet connector 40 is rotated by means of a hexagonal key 68 inserted into the hexagonal aperture 48. The location of the guide pin 26 in the third fixing plate aperture 60 prevents the fixing plate 54 from rotating with the second inlet connector 40. The fixing plate 54 is thus moved up the thread of the second inlet connector 40 until the washer 62 is brought into contact with the underside of the basin 66. The tap aperture 64 is necessarily smaller than the base 18 and the fixing plate 54, but large enough to allow the fixing plate 54 to pass through it at an angle.

Once the base 18 is thus positioned, the first inlet connector 28 is inserted through the apertures 20, 56 of the base 18, washer 62 and fixing plate 54. The first and second flexible hoses 36, 50 are then connected to the lower ends 32, 44 of the first and second inlet connectors 28, 40. The hose fittings 38, 52 are screwed into the lower ends 32, 44 and hand-tightened. No tools, therefore, are required underneath the basin 66.

It can be seen that securing the tap mounting 11 to the plumbing fixture occurs by tightening the connector 40 above the exposed upper side of the basin 66. The lower end 44 of the second inlet connector 40, washer 62 and fixing plate 54 are inserted through the tap aperture 64 from the upper side of the basin 66. Tightening of the fixing plate 54 against the underside of the basin 66 by rotation of the second inlet connector 40 is performed from the upper side of the basin 66, as is insertion of the first inlet connector 28 into the base 18.

In this embodiment, the only part of installation that takes place underneath the basin 66 is screwing the hose fittings 38, 52 into the lower ends 32, 44 of the first and second inlet connectors 28, 40.

Figure 8:
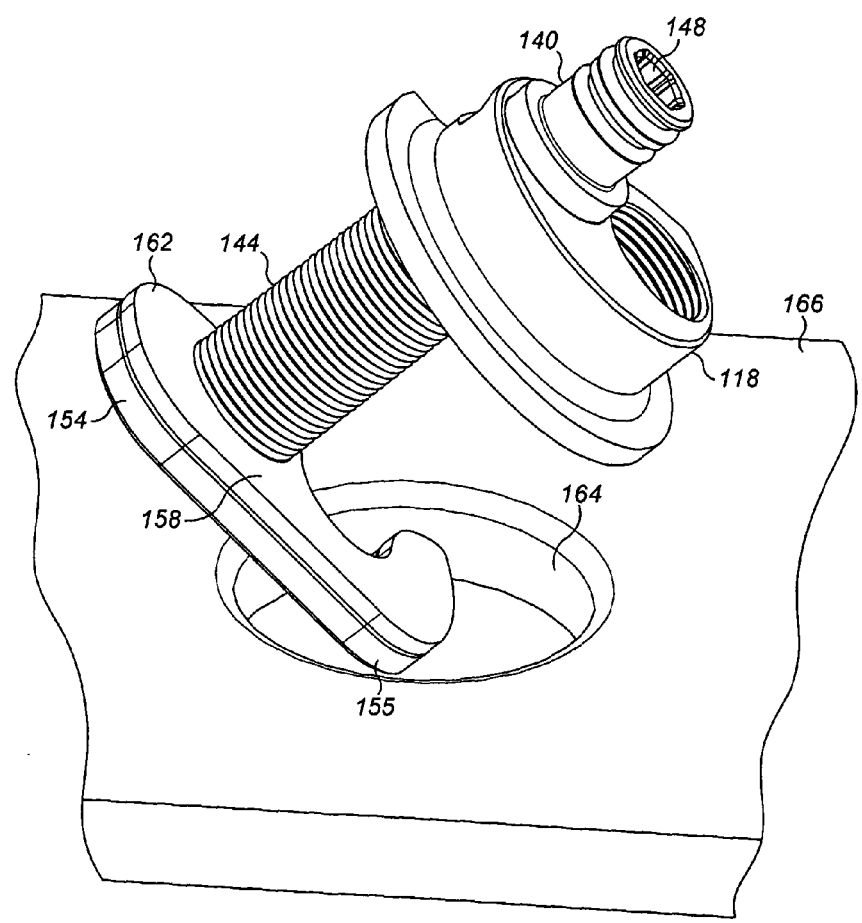
FIG. 8 shows a perspective view of a second embodiment of the present invention.

FIG. 8 shows an alternative embodiment of the tap fitting of FIGS. 1 to 7. Features which are substantially the same as those of the previous embodiment are given corresponding reference numbers with the additional prefix "1". This second embodiment is substantially the same as the first embodiment, with the exception that the kidney-shaped fixing plate 54 and kidney-shaped washer 62 are replaced with a fixing plate 154 having a single tapped aperture 158 and a hook-shaped extension 155 parallel to the main body of the fixing plate 154, and a washer 162 of the same shape. The base 118 does not in this embodiment have a guide pin.

During installation, the washer 162 and the fixing plate 154 are attached to the lower end 144 of the second inlet connector 140, the threaded surface of the second inlet connector 140 being screwed into the tapped aperture 158 of the fixing plate 154. The fixing plate 154 is rotated so that the hook 155 is aligned with the first base aperture 120. The lower end 144 of the second inlet connector 140 is then inserted through the tap aperture 164 in the basin 166, together with the washer 162 and the fixing plate 154. As with the previous embodiment, the shape of the fixing plate 154 allows it to be manoeuvred through the tap aperture 164 without deformation. The first inlet connector 128 is then inserted through the second base aperture 122 so that it extends through the fitting aperture 164. The hook 155 of the fixing plate 154 curves around the lower end 132 of the first inlet connector 128.

A hexagonal key (not shown) is inserted into a hexagonal aperture 148 at the upper end 142 of the second inlet connector 140, and used to rotate the second inlet connector 140. The fixing plate 154 is prevented from turning by the first inlet connector 128 interfering with the hook 155. The fixing plate 154, therefore, moves up the second inlet connector 140 until the washer 162 is tight against the underside of the basin 166. The flexible hoses 136, 150 are then attached to the lower ends 132, 144 of the first and second inlet connectors 128, 140 by means of hose fittings 138, 152, and are tightened by hand. Thus, as in the previous embodiment, the majority of the installation of the tap mounting 111 takes place from the exposed upper surface of the basin 166.

Figure 9:
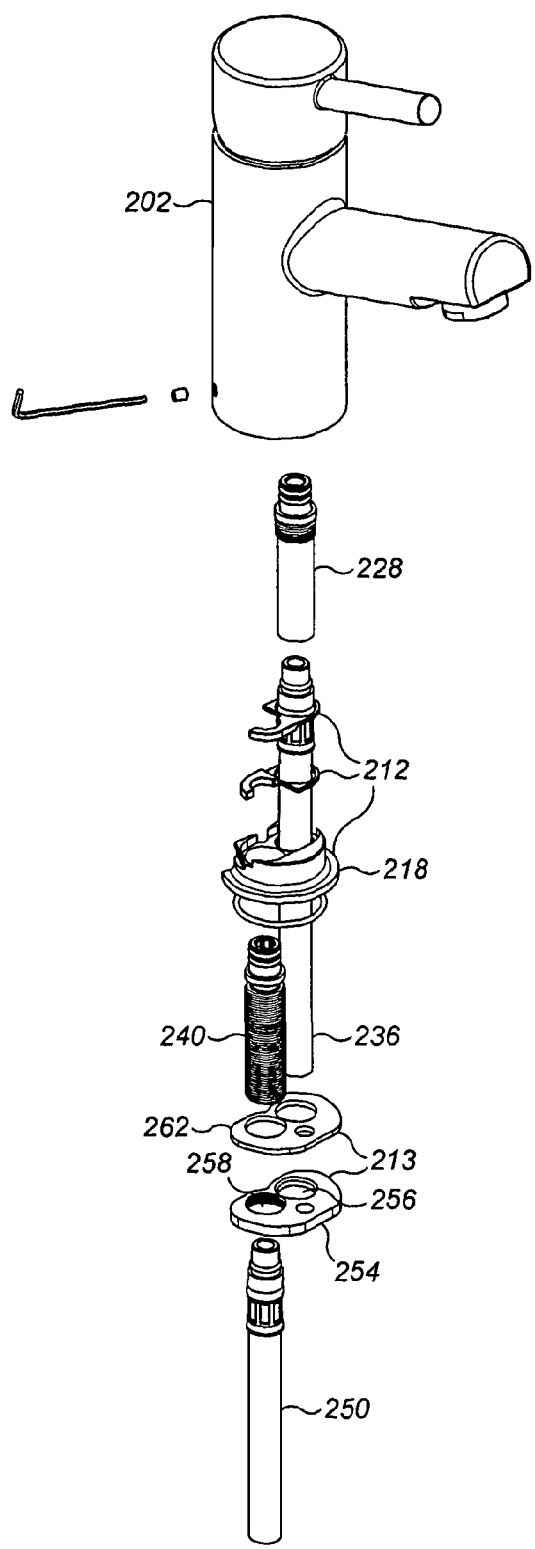
FIG. 9 shows an exploded view of a third embodiment of the present invention.
Figure 10:
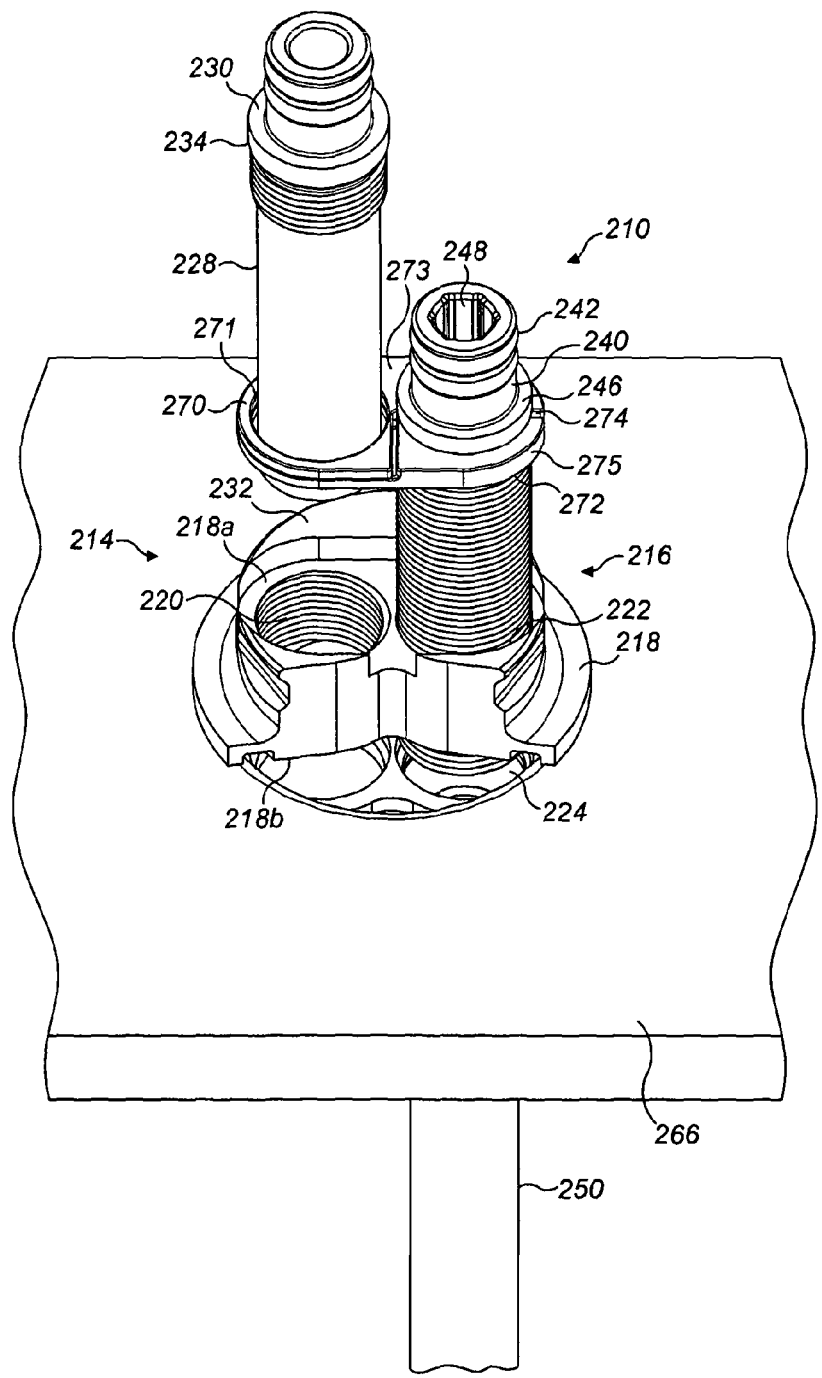
FIG. 10 shows a first stage of installation of the embodiment of FIG. 9.
Figure 11:
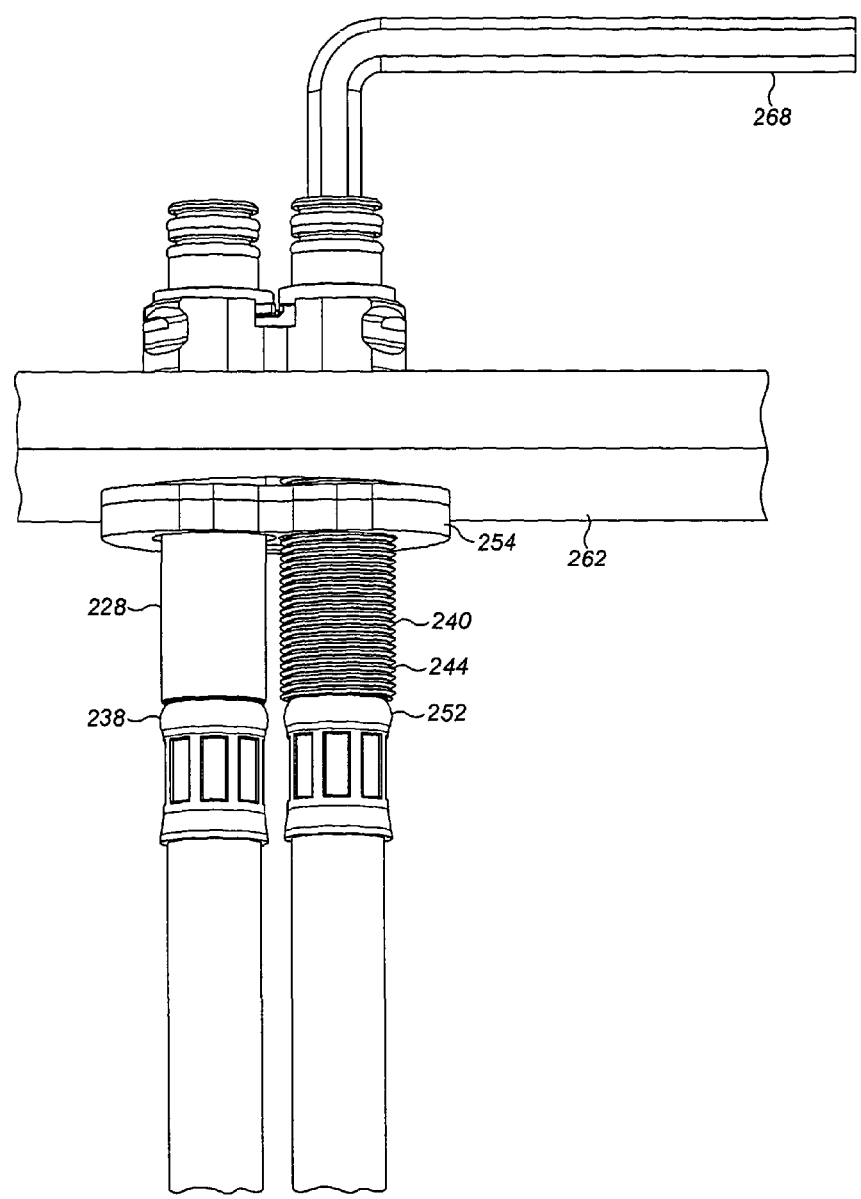
FIG. 11 shows a second stage of installation of the embodiment of FIG. 9.

A third embodiment of the tap fitting is shown in FIGS. 9 to 11. Features which are substantially the same as those of the previous embodiment are given corresponding reference numbers with the prefix "2".

The tap fitting of this embodiment comprises a fitting 210 for a mixer tap 202 for a basin 266. A tap mounting 211 is used to connect the tap 202 to the basin 266. The tap mounting 211 comprises in this embodiment an upper mounting part 212 and a lower mounting part 213. The upper mounting part 212 consists of a substantially kidney-shaped base 218 having an upper side 218a, a lower side 218b and first and second cylindrical base apertures 220, 222 extending from the upper side 218a to the lower side 218b. A flange 224 edges the lower side 218b of the base 218.

The lower mounting part 213 comprises a kidney-shaped fixing plate 254 and a kidney-shaped washer 262. The fixing plate 254 has first and second inlet connector apertures 256, 258. The washer 262 has corresponding apertures. The second fixing plate aperture 258 is threaded.

The tap fitting 210 further comprises first and second inlet connectors 228, 240 and first and second flexible hoses 236, 250. The inlet connectors 228, 240 and flexible hoses 236, 250 are substantially similar to those of the first embodiment.

Upper and lower retainers 270, 272 are configured to encircle the two inlet connectors 228, 240. The upper retainer 270 comprises a plate defining a circular aperture 271 and a semi-circular hook 274 extending parallel to the main body of the retainer 270. The lower retainer 272 comprises a plate defining an aperture 273, similar to that of the upper retainer 272, and a semi-circular hook 275 curved in the opposite direction to that of the upper retainer. The apertures 271, 273 of the two retainers 270, 272 are positioned about the first connector 228 so that on installation the retainers 270, 272 fit between the collar 234 of the inlet connector 228 and the upper side 218a of the base 218. The retainer hooks 274, 275 meet to encircle the second inlet connector 240 between its collar 246 and the upper side 218a of the base.

Installation of the fitting 210 is carried out by firstly fitting the washer 262 over the second inlet connector 240 then connecting the fixing plate 254 by its tapped hole 258 to the threaded outer surface of the second inlet connector 240, then inserting the second flexible hose 250 into the lower end 244 of the second inlet connector 240 by means of the second hose fitting 252. The second inlet connector 240 is then inserted through the tap aperture 264 from below the basin 266. The base 218 is positioned over the second inlet connector 240 so that its underside 18b rests on the top of the basin 266. The two retainers are then hooked around the second inlet connector 240 below its collar 246 so that the two retainer apertures 271, 273 are aligned. The first inlet connector 228 is inserted through the retainers 270, 272, the base 218, the washer 262 and the fixing plate 254, as shown in FIG. 7. The fixing plate 254 is tightened by means of a hexagonal key 268 inserted into a hexagonal aperture 248 in the upper end 242 of the second inlet connector 240 and used to turn the second inlet connector 240. Rotation of the fixing plate 254 is prevented by interference of the first inlet connector 228. This is held securely in place by the retainers 270, 272. Once the fixing plate 254 is tightened, the first flexible hose 236 is connected to the lower end 232 of the first connector by means of the first hose fitting 238. Both hose fittings 238, 252 are hand tightened.

Figure 12:
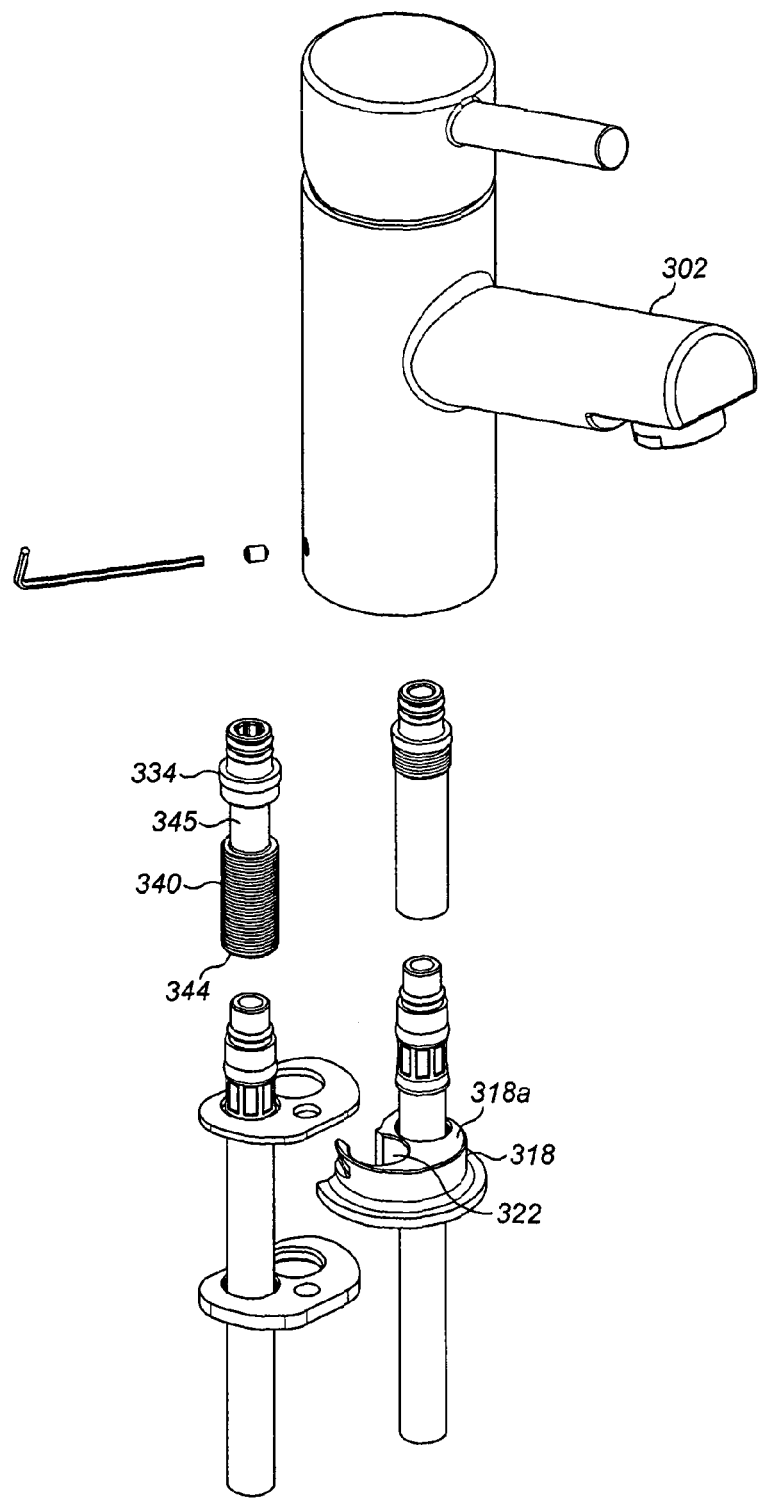
FIG. 12 shows an exploded view of a fourth embodiment of the present invention.
Figure 13:
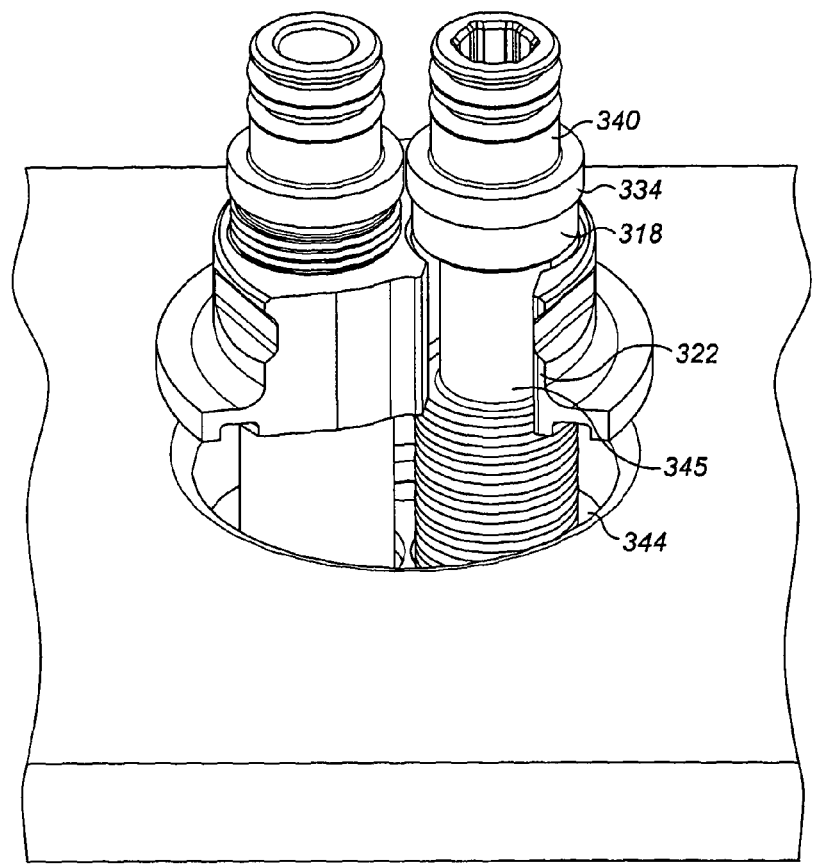
FIG. 13 shows a perspective view of the embodiment of FIG. 12.
Figure 14:
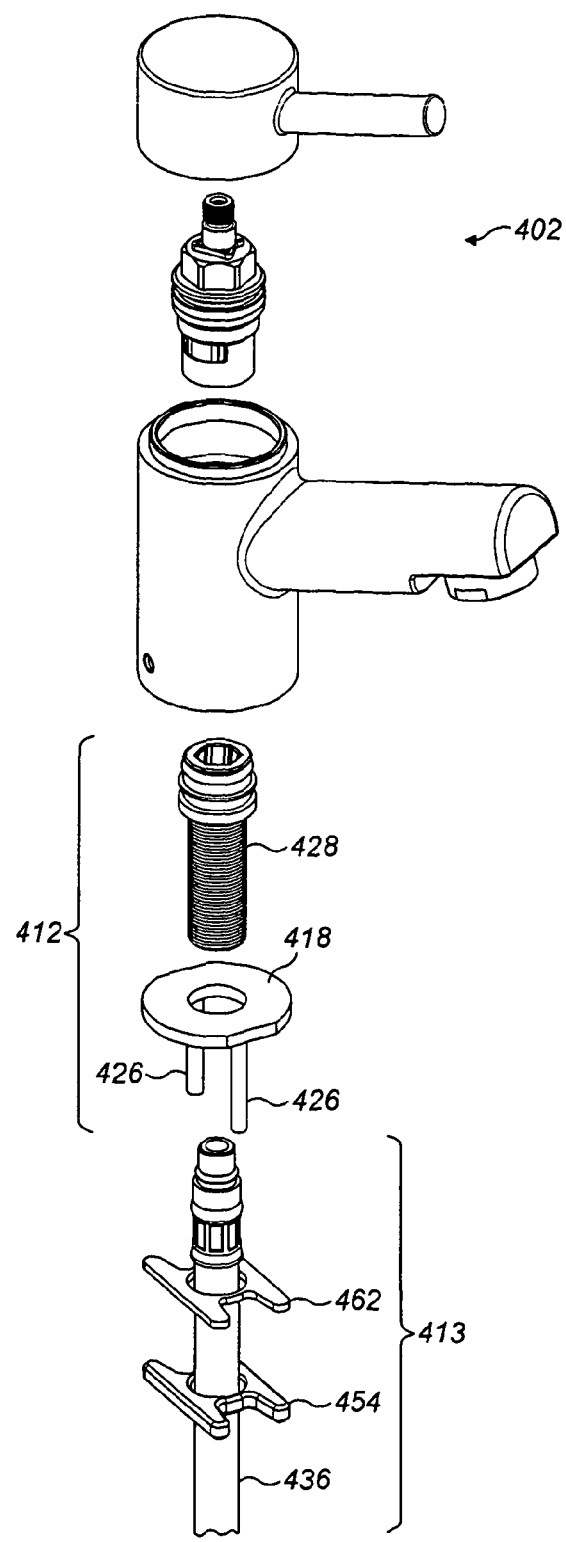
FIG. 14 shows an exploded view of a fifth embodiment of the present invention.
Figure 15:
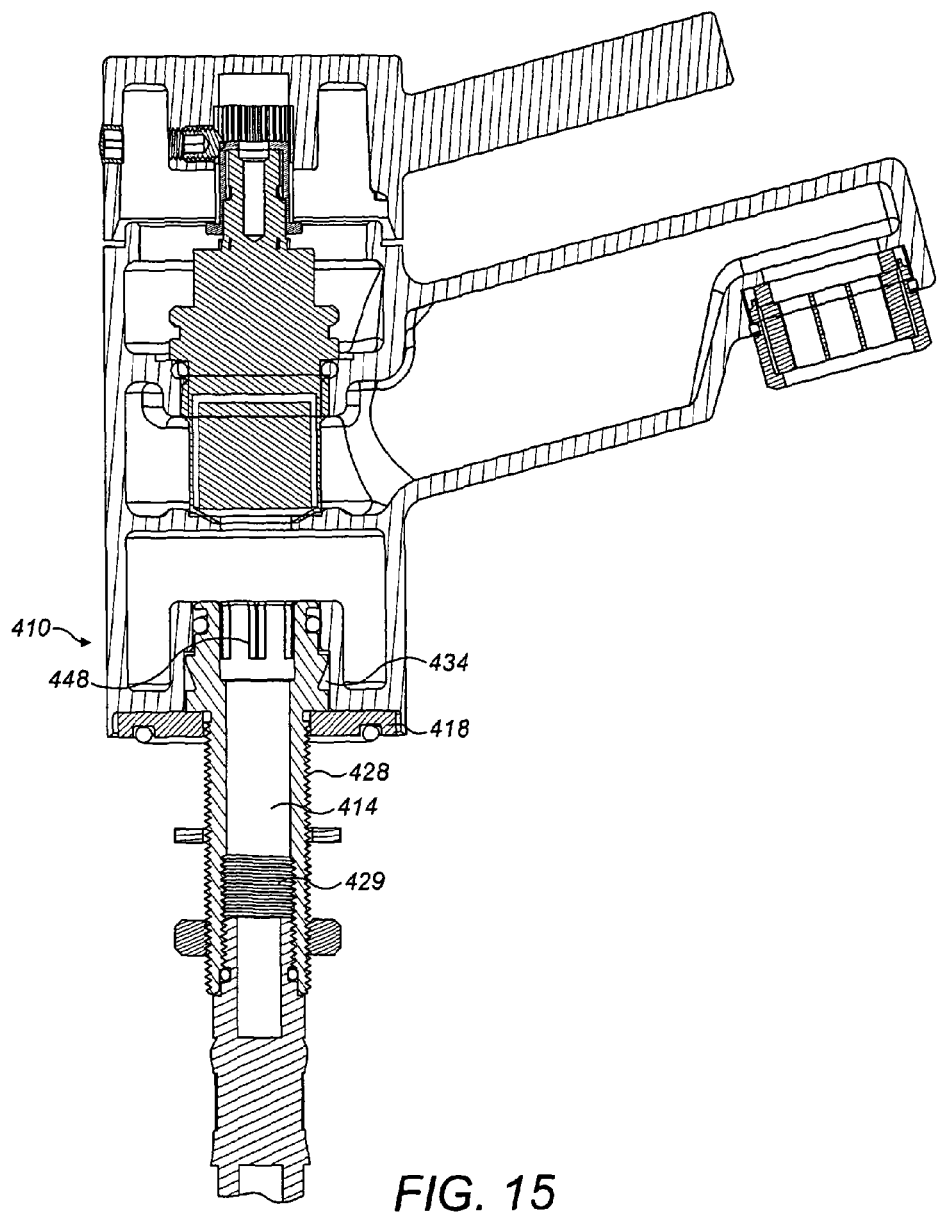
FIG. 15 shows a cross-sectional view through the embodiment of FIG. 14.
Figure 16:
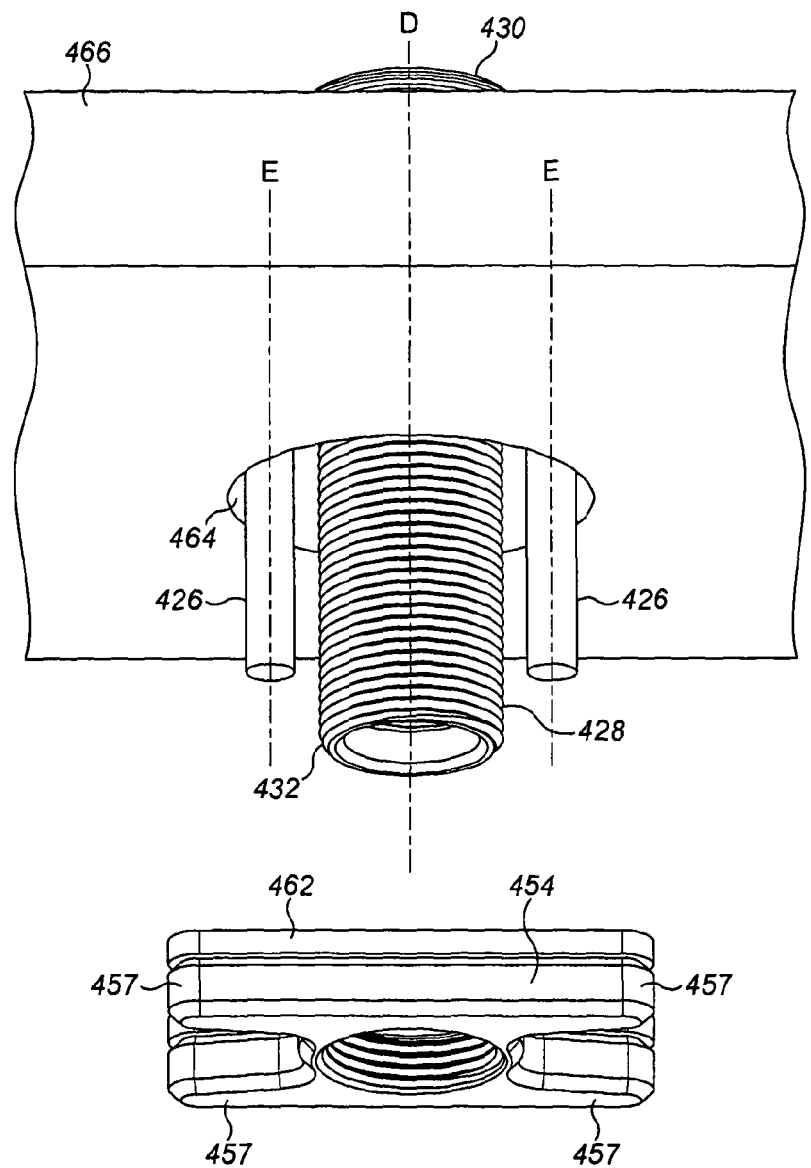
FIG. 16 shows a perspective view of the embodiment of FIGS. 14 and 15.
Figure 17:
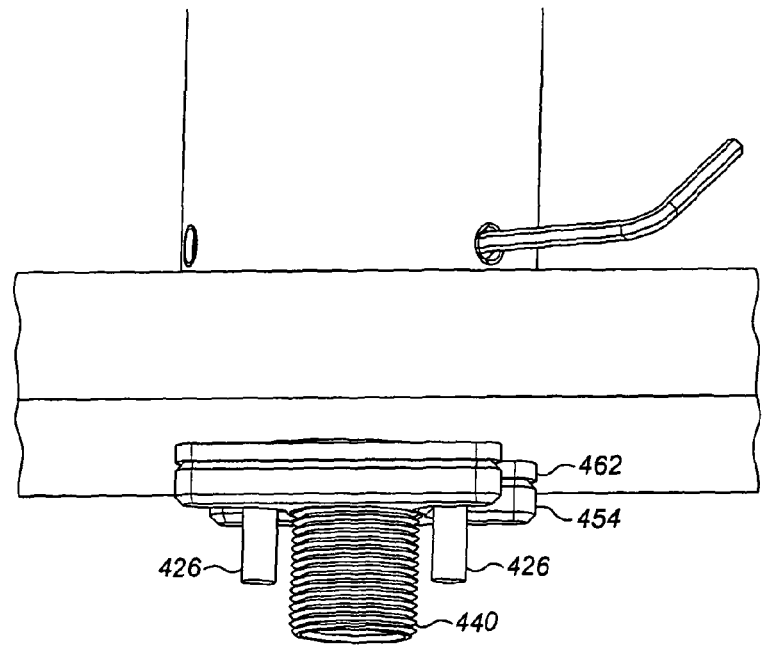
FIG. 17 shows a further perspective view of the embodiments of FIGS. 14 to 16.
Figure 17:
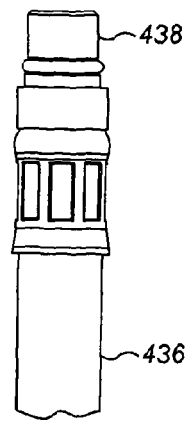

A fourth embodiment of the tap fitting is shown in FIGS. 12 and 13. Features which are substantially the same as those of the previous embodiment are given corresponding reference numbers with the prefix "3".

This fourth embodiment is similar to the first embodiment, except that in this case the base 318 is not fully closed around the second base aperture 322. The second inlet connector 340 is threaded only from roughly half way to its lower end 344, leaving an unthreaded section 345 from below a collar 334 towards the upper end 342, to roughly halfway along the length of the connector 340. Installation of this embodiment is similar to that of the third embodiment, except that in this case the second inlet connector 340 is inserted sideways into the base 318 through the open side of the second base aperture 322 so that the collar 334 rests on the base upper end 318a and the unthreaded section 345 passes through the base 318.

A fifth embodiment of the invention is shown in FIGS. 14 to 17. Features which are substantially the same as those of the previous embodiments are given corresponding reference numbers with the additional prefix "4". This embodiment comprises a fitting 410 for a single tap 402 for a basin 466.

The tap 402 is connected to a basin 466 by means of a tap mounting 411. The tap mounting 411 comprises in this embodiment an upper mounting part 412 and a lower mounting part 413. The upper mounting part 412 consists of a substantially circular base plate 418, extending from the underside of which are two guide pins 426 at opposing points on the circle of the base plate 418 and inlet connector 428. The lower mounting part 413 comprises an H-shaped fixing plate 454 with legs 457 and a threaded aperture at the centre of the H, and a corresponding H-shaped washer 462, also with a central aperture.

The tap fitting 410 further comprises a inlet connector 428 and a flexible hose 436. The inlet connector 428 has an internal bore, and an upper end 430 and a lower end 432, a hexagonal aperture 448 at its upper end 430 and a collar 434 close to its upper end 430. The inlet connector 428 has an internal threaded section 429 towards its lower end 432. The outer surface of the inlet connector 428 is threaded from the collar 434 to the lower end 432. The flexible hose 436 has a free end and an end connected to a plumbing system (not shown). At the free end is a hose fitting 438 having an external threaded section 439 and an external 0-ring seal 437.

On installation, the base plate 418 is positioned on the top of the basin 466 so that the guide pins 426 extend through a tap aperture 464. The connector 428 is inserted through the tap aperture 464, and the washer 462 and fixing plate 454 are attached to its lower end 432. The lower end 432 of the inlet connector 428 extends beyond the two guide pins 426. The fixing plate 454 is tightened by means of a hexagonal key (not shown) inserted into the hexagonal aperture 448 and turned. The interference of the guide pins 426 with the legs 457 of the fixing plate 454 prevent the fixing plate from turning with the connector 428, so it is moved up the threaded outer surface of the connector 428 until the washer 462 is tight against the underside of the basin 466. The flexible hose 436 is then connected to the lower end 432 of the connector 428 and the hose fitting 438 is hand-tightened.

Figure 18:
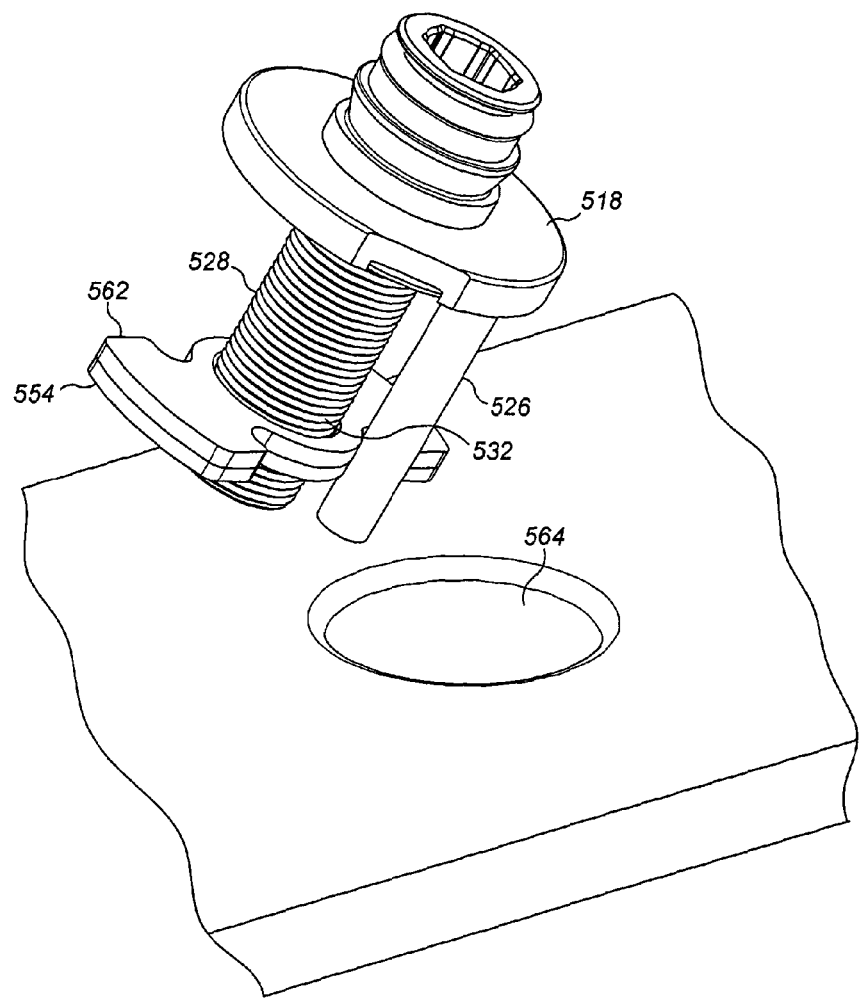
FIG. 18 shows a perspective view of a sixth embodiment of the present invention.

FIG. 18 shows a variation of the embodiment of FIGS. 14 to 17. Features which are substantially the same as those of the previous embodiments are given corresponding reference numbers with the additional prefix "5". The base plate 518 has in this embodiment a single guide pin 526 and the H-shaped fixing plate 454 is replaced by an S-shaped fixing plate 554. Installation also varies, as the S-shaped fixing plate 554 is attached to the connector 528 prior to the connector's insertion through the tap aperture 564. The S-shaped fixing plate 554 is passed through the tap aperture 564 without deformation. There is an S-shaped washer 562 rather than the H-shaped washer of the previous embodiment. On tightening, the single guide pin 526 sits on the inside of one of the curves of the S-shaped fixing plate 554 and so prevents the fixing plate 554 from turning with the connector 528. A flexible hose (not shown) is then connected by means of a hose fitting 538 to the lower end 532 of the connector 528, and hand-tightened in place. As with the first and second embodiments, the majority of installation of this embodiment of the tap mounting is carried out from the exposed upper side of the basin.

The single-component fixing plate of each embodiment allows the majority of installation to take place from the exposed surface of a plumbing fixture. Use of existing connectors in holding and tightening the fixing plate prevents additional components being used, thus keeping manufacturing costs to a minimum and further simplifying installation. Not having to deform the fixing plate on installation reduces the likelihood of the fixing plate becoming misshapen or damaged during installation. Installation substantially from one (upper) surface makes installing the tap mounting on plumbing fixtures with limited access beneath the fixture more straightforward.

The nature of the hose fittings of each embodiment allows them to be tightened by hand. A seal is formed by the O-ring seal within each fitting without the need for tools, thus removing the need for time consuming manipulation of tools such as spanners and wrenches in an area of limited space. Installation of taps is thus again made easier and quicker, and correspondingly cheaper.

Whilst we have used the terms "over", "under", "upper" and "lower" in respect of the surface of the plumbing fixture, it is to be understood that the plumbing fixture could be oriented in a range of orientations, for example horizontally, in the case of a basin, vertically, in the case of a shower, or even at an angle between the vertical and the horizontal. "Over" and "upper" relate to the outside of the fixture, "under" and " lower" to the inside.

The invention claimed is:

1. A tap mounting and a plumbing fixture, the tap mounting for mounting a tap to the plumbing fixture, the plumbing fixture having a surface with an aperture, and the tap mounting comprising an over-surface mounting part, an under-surface mounting part defining a threaded aperture, a threaded elongate member and a second elongate member, wherein in use the over-surface mounting part is above the surface of the plumbing fixture, the under-surface mounting part is below the surface of the plumbing fixture, the elongate members extend from the over-surface mounting part through the plumbing fixture aperture and the threaded elongate member passes through the threaded aperture of the under-surface mounting part, wherein rotation of the under-surface mounting part is prevented by the second elongate member, wherein the threaded elongate member comprises an internal bore and is configured for connection to a hose, wherein on installation of the tap mounting the under-surface mounting part is arranged to be passed through the plumbing fixture aperture substantially without deformation, and wherein the tap mounting is configured to enable the tap mounting to be secured to the plumbing fixture by manipulation of the tap mounting substantially wholly at or above the surface of the plumbing fixture, and wherein the under-surface mounting part comprises a single component.

2. A tap mounting and a plumbing fixture according to claim 1 wherein the under-surface mounting part comprises a hook configured to extend up to halfway around the second elongate member.

3. A tap mounting and a plumbing fixture according to claim 1 wherein the under-surface mounting part is S-shaped in plan.

4. A tap mounting and a plumbing fixture according to claim 1 wherein the under-surface mounting part is H-shaped in plan.

5. A tap mounting and a plumbing fixture according to claim 1 wherein the over-surface mounting part is configured to allow either the threaded elongate member or the second elongate member to be held in place by the over-surface mounting part following insertion through the over-surface mounting part from below the surface of the plumbing fixture.

6. A tap mounting and a plumbing fixture according to claim 5 wherein the over-surface mounting part comprises a pair of retainers, and the threaded elongate member and the second elongate member each comprise a collar, and wherein said retainers encircle either the threaded elongate member or the second elongate member below said collar, and are configured to axially secure the remaining second elongate member or threaded elongate member below said collar.

7. A tap mounting and a plumbing fixture according to claim 5 wherein the over-surface mounting part comprises a slotted aperture, and the threaded elongate member or the second elongate member comprises a narrowed portion, and wherein the slotted aperture is configured to allow said narrowed portion of the threaded elongate member or the second elongate member to be axially secured in the over-surface mounting part.

8. A tap mounting and a plumbing fixture according to claim 1 wherein the threaded elongate member is configured for manual securement to said hose.

9. A tap mounting and a plumbing fixture according to claim 1 wherein the second elongate member comprises an internal bore and is configured for connection to a hose.

10. A tap mounting and a plumbing fixture according to claim 9 wherein the second elongate member is configured for manual securement to said hose.

11. A tap mounting and a plumbing fixture according to claim 1 further comprising a washer positioned between the under-surface mounting part and the plumbing fixture.

12. A method of installing a tap mounting to a plumbing fixture, the plumbing fixture having a surface and an aperture, comprising the steps of:
   a) providing an over-surface mounting part configured for tap attachment, a threaded elongate member that comprises an internal bore and is configured for connection to a hose, a second elongate member and an under-surface mounting part comprising a single component forming a fixing plate;
   b) inserting the threaded elongate member through the over-surface mounting part;
   c) attaching the fixing late to the threaded elongate member;
   d) inserting the fixing plate through the aperture without deformation of the fixing plate;
   e) positioning the over-surface mounting part on the surface of the plumbing fixture;
   f) inserting the second elongate member through the over-surface mounting part; and
   g) rotating the threaded elongate member so that the fixing plate moves axially along the threaded elongate member towards the plumbing fixture until the fixing plate is tightened against the underside of the plumbing fixture.

13. A tap mounting and a plumbing fixture, the tap mounting for mounting a tap to the plumbing fixture, the plumbing fixture having a surface with an aperture, and the tap mounting comprising an over-surface mounting part, an under-surface mounting part defining a threaded aperture, a threaded elongate member and a second elongate member, wherein in use the over-surface mounting part is above the surface of the plumbing fixture, the under-surface mounting part is below the surface of the plumbing fixture, the elongate members extend from the over-surface mounting part through the plumbing fixture aperture and the threaded elongate member passes through the threaded aperture of the under-surface mounting part, wherein rotation of the under-surface mounting part is prevented by the second elongate member, wherein the threaded elongate member comprises an internal bore and is configured for connection to a hose, wherein on installation of the tap mounting the under-surface mounting part is arranged to be passed through the plumbing fixture aperture substantially without deformation, and wherein the tap mounting is configured to enable the tap mounting to be secured to the plumbing fixture by manipulation of the tap mounting substantially wholly at or above the surface of the plumbing fixture, wherein the second elongate member comprises an internal bore and is configured for connection to a hose.

* * * * *